(12) United States Patent
Karty

(10) Patent No.: US 7,877,346 B2
(45) Date of Patent: Jan. 25, 2011

(54) METHOD AND SYSTEM FOR PREDICTING PERSONAL PREFERENCES

(75) Inventor: Kevin D. Karty, Newton, MA (US)

(73) Assignee: Affinova, Inc., Waltham, MA (US)

( * ) Notice: Subject to any disclaimer, the term of this patent is extended or adjusted under 35 U.S.C. 154(b) by 749 days.

(21) Appl. No.: 11/758,877

(22) Filed: Jun. 6, 2007

(65) Prior Publication Data

US 2008/0306895 A1      Dec. 11, 2008

(51) Int. Cl.
  *G06F 15/18*      (2006.01)
(52) U.S. Cl. .............................. 706/62; 706/18; 706/21; 706/45; 705/1.1; 705/10; 705/12
(58) Field of Classification Search .................... 706/15, 706/18, 20, 21, 45, 46, 48, 62; 705/1, 10, 705/12; 707/3, 6
See application file for complete search history.

(56) References Cited

U.S. PATENT DOCUMENTS

| | | | |
|---|---|---|---|
| 5,704,017 A * | 12/1997 | Heckerman et al. ........... 706/12 |
| 6,041,311 A * | 3/2000 | Chislenko et al. ............. 705/27 |
| 6,438,579 B1 * | 8/2002 | Hosken ....................... 709/203 |
| 2004/0199923 A1 * | 10/2004 | Russek ........................ 719/310 |
| 2005/0203807 A1 * | 9/2005 | Bezos et al. .................. 705/26 |
| 2005/0261953 A1 * | 11/2005 | Malek et al. .................. 705/10 |

OTHER PUBLICATIONS

Adomavicius et al., "Toward the next generation of recommender systems: a survey of the state-of-the-art and possible extensions", IEEE Transactions of Knowledge and Data Engineering, 2005, pp. 734-749.*
Pazzani, "A framework for collaborative, content-based and demographic filtering", 2000, pp. 393-408.*

* cited by examiner

*Primary Examiner*—Michael B. Holmes
*Assistant Examiner*—Omar F Fernandez Rivas
(74) *Attorney, Agent, or Firm*—Goodwin Procter LLP

(57) ABSTRACT

The invention provides techniques for building multiple predictive models of individuals' affinities for attributes of objects and/or services. The accuracies of multiple predictive models are measured and the models are combined based on the measurements, resulting in a more accurate predictive model of individual-specific affinities for attributes of the objects and/or services.

42 Claims, 5 Drawing Sheets

METHOD AND SYSTEM FOR PREDICTING PERSONAL PREFERENCES

TECHNICAL FIELD OF THE INVENTION

This invention relates to improvements in the process of determining a person's preferences for products, services and media content, and, more particularly, to methods and systems for generating and combining multiple individual-specific predictive models to arrive at a more accurate representation of personal preferences.

BACKGROUND OF THE INVENTION

The design and fabrication of products often requires large groups of people with highly specialized skills and knowledge, often numbering in the thousands, and often spread across continents. Furthermore, the development lead-time for some products can easily stretch to many years, especially for large, costly products such as automobiles, boats and homes. The complexity of these products (and in many cases services) and the processes used to develop them, is reflected in the organizational structure of the companies which design and make them. Within the typical product development organization, the stakeholders in a given product development project include such diverse departments as product planning, styling, engineering, sales and marketing, manufacturing, after-sales service, legal affairs, and more recently, external suppliers and business partners. Each of these departments or organizations has its own objectives, constraints, and performance measures, and its executives and managers their own goals and idiosyncrasies. These and other factors magnify the distance between the people who design products and services, and the customers to whom they are marketed, whether the distance is measured in terms of geography, time, and technical knowledge, or in terms of worldview, goals, and daily concerns.

Designing and producing a product incorporating the "voice of the customer" remains fraught with errors and distortions. For example, merely ascertaining the wants and needs of the customer can be difficult and often provides contradictory results. Further, trying to translate those wants and needs into a decision, product, artifact or service while minimizing distortions can be arduous and costly.

Conventional techniques employed by market researchers range from highly qualitative methods borrowed from ethnography, such as open-ended interviewing, participant observation, and focus groups, to highly popular quantitative statistical methods such as survey research and conjoint analysis. More recently, collaborative filtering has been used to predict an individual's affinity for a particular product or service based on their membership in a particular group or similarities with other individuals. As one example, U.S. Patent Application Publication Number 2006/0259344, entitled "Statistical Personalized Recommendation System" by Patel, et al. describes techniques for analyzing personal ratings of and preferences for items that include grouping respondents into cohorts based on various characteristics. Such approaches generally apply standard cohort-wide models (such as hierarchical Bayes estimation or latent class modeling) to individuals in the cohort and attempt to adjust the cohort-specific model that borrow information across multiple groups and groupings. They do not, however generate individual level parameter estimates for a particular individual based on their membership in multiple groups. Furthermore, collaborative filtering techniques do not consider an individual's membership in multiple groups or groupings or the relative extent to which each one of multiple group membership affects an individual's overall predicted affinity for a particular item.

Each of these tools and techniques suffer from various shortcomings such that there remains a need for techniques for deriving superior, individual-specific predictive models based on an individual's membership in multiple groups or groupings.

SUMMARY OF THE INVENTION

In a generic sense, the invention provides methods and systems for segmenting data indicative of demographic, behavioral or attitudinal characteristics and/or affinities for attributes of products and/or services of a population of people, and using the segmented data in combination with modeling techniques (such as hierarchical Bayes and/or latent class modeling) to generate multiple models that attempt to predict each individual person's affinity for particular attributes. By comparing the predicted data with actual observed data, each model's ability to accurately predict individual level behaviors can be estimated, and the models can be combined in such a way that each individual's affinities, preferences and behaviors can be further predicted with even greater accuracy. Aggregating the combined models across many people provides an accurate global affinity model across many dimensions.

By separating the data by various attributes and characteristics of individuals (e.g., demographic, attitudinal, behavioral, etc.) and using predictive modeling techniques for each grouping separately, the technique accurately estimates preferences of individuals that deviate from overall averages. Moreover, and in contrast with conventional methods, the technique recognizes that individuals may belong to multiple groups, but the degree to which any particular individual behaves like others in the group can vary widely. This is particularly important for modeling preferences of those people who belong to small but often important niche segments of the population that would otherwise be overlooked or misrepresented if force-fit into other groups. These niche segments can be critical to marketers, as they often represent cutting edge adopters, trend setters, previously unrecognized (but often strong) correlations among product attributes, and population segments that may be interested in high-margin products. Not only does this approach more accurately predict affinity data for niche segments; in fact the modeling accuracy for any person is improved to the extent that the individual level data is insufficient to precisely estimate that person's complete preference profile, and to the degree that he behaves like other members of population segments to which he belongs that potentially have different preferences from an overall average.

Therefore, in a first aspect, the invention provides a method for developing a model of predictive preferences of people among decision objects that have various attributes. The method includes the steps of obtaining a data set indicative of demographic, behavioral, and/or attitudinal characteristics of people as well as expressed affinity for decision objects that include one or more attributes, and obtaining sets of predictive models based on the data set. A first set of predictive models is based on demographic characteristics (such as hierarchical Bayesian models based on demographic segmentation, with or without individual-level covariates or "fixed effects") and a second set is based on expressed affinities for the attributes (such as hierarchical Bayesian models based on latent class groupings segmented by the expressed affinities, also with or without individual-level covariates or "fixed effects"). The method also includes selecting, for an individual person, a predictive model from each of the sets based on the person's demographic characteristics and their expressed affinity for the attributes of the decision objects and calculating predicted affinities for the attributes of the decision objects using each of the selected models. A weighting factor is calculated for each of the selected models, and the calculated predicted affinities are combined based on the weighting factors to produce a model for predicting the person's affinity for the attributes of the decision objects. Such a model may be used, for example, to determine optimal designs and/or pricing for new products and/or services (including groupings thereof) as well as recommendations for products and/or services.

The decision objects can be any product, service or combination of the two. For example, the decision objects can be investment products, credit cards or financial packages of any sort, telecommunication services or service bundles, automobiles and subparts thereof, apparel, ensembles of clothing, shoes, watches, jewelry, toys, consumer electronics, recipes, foods, beverages, drugs, pharmaceutical or nutraceutical products, book or magazine covers, newspaper layouts, packaging, perfumes, scents, color palettes, fabrics, furnishings and interior designs, wallpaper, chairs, tables, lamps, couches, bed spreads, quilts, carpets, decorative objects, utilitarian objects, or parts thereof, silverware, flatware, crystal ware, fixtures, architecture, web sites and web pages, software, graphical user interfaces, software features, cable TV packages, vacation packages, transportation schedules, travel programs, discount programs, academic programs or curricula; advertising materials such as printed advertisements, billboard messages, logos, messaging platforms, positioning platforms, branding strategies, diet plans, exercise plans, restaurant menus, store layouts, office layouts, direct marketing campaigns (fliers and inserts), e-marketing campaigns, business strategies, speech outlines, sales presentations, election campaigns, story lines, business plans, songs, jingles, business services and personal services.

The attributes of the decision objects can be virtually any physical or intellectual characteristic of a product or service, such as size, color, shape, price, material, design, shape, contents, packaging, theme, dimension, aspect ratio, dominant color, background color, color scheme, size of print, presence or absence of pictorial materials, manner of presentation, varying types of content for pictorial materials, text content (such as benefits, feature descriptions, etc.) and any combination of the above. The demographic characteristics of individuals can be age, sex, nationality, political or other social group affiliation, income level, geographic affiliation, religion, race, education, profession, height, physical condition, health condition, weight and any combination thereof. The behavioral characteristics may be self-reported, derived, or observed data on past, current, or anticipated product/food/service usage, product/food/service consumption behavior, product ownership, daily activities, non-daily activities, personal habits, social habits or activities, transportation behavior, entertainment consumption behavior, and any combination thereof. The attitudinal characteristics may also be self-reported, derived, or observed beliefs, thought patterns, thought habits, opinions, likes and dislikes, and any combination thereof.

In various embodiments, the weighting factors may be based on a relationship between the predicted affinities for the attributes of the decision objects calculated using each of the models and the person's actual expressed affinity for such attributes (obtained, for example, through focus group interviews, surveys, actual purchase/selection/allocation behavior made by individuals in a real or hypothetical setting, purchased from market research firms, or other such similar methods). In some cases, the relationship may be expressed as an accuracy score reflecting the ability of the model to accurately predicted affinities based on expressed or observed affinities. In one approach, the weighting factor for a given model is proportional to the accuracy score for that model divided by the sum of the accuracy scores for all of the models (e.g., each weighting factor is normalized based on the complete set of weighting factors).

In some embodiments, a non-segmented or aggregated predictive model based on the data set is used to calculate a predicted affinity for the person, and a weighting factor can then be calculated for the non-segmented predictive model (by comparing the person's expressed affinities to the predicted results obtained using the non-segmented model, for example), and the non-segmented model can be included in the combination of models according to its weighting factor.

In some implementations, aggregate parameter estimates from one or more of the segmented models (either based on latent class, demographics, behavior and/or attitudinal characteristics) may be combined with individual-level (i.e., person-specific) parameter estimates from hierarchical models (with or without individual-level covariates or "fixed effects"). In certain instances, the combination may be achieved using a weighting factor as described above.

In some implementations, a subset weighting factor can be calculated for subsets of the attributes using each of the selected models, and the calculated predicted affinities for each attribute of the decision objects can then be combined based on the subset weighting factors.

The steps above can be repeated for multiple people to obtain multiple predictive models which may then be combined into an aggregate model for predicting affinities for attributes of objects among members of a more general population. The models can then be adapted for other purposes, such as predictive preference share for objects in a competitive or non-competitive environment, sales of objects, profits related to sales of objects, selection of programs, optimal configurations of sets of objects, overall satisfaction with objects or sets of objects, and similar applications.

In another aspect, the invention provides a system for developing a model of predictive preferences of individuals among decision objects having various attributes that includes a modeling engine configured to apply sets of predictive models to a data set comprised of demographic behavioral, and/or attitudinal characteristics and expressed affinity for attributes of decision objects from a plurality of people. A first set of predictive models is segmented by one or more of the demographic, attitudinal and/or behavioral characteristics, and a second set of models is segmented by the affinity for the attributes of the decision objects. The modeling engine also selects a predictive model from each set for a person based on their demographic characteristics and expressed affinity for the attributes of the decision objects, calculates a predicted affinity for the attributes of the decision objects using each of the selected models for that person, and calculates a weighting factor for each of the selected models. The calculated predicted affinities for each attribute can then be combined based on the weighting factors, thereby resulting in a predictive model for the person's affinity for the attributes of the decision objects.

In some embodiments, the system can also include a data storage module for storing the data set. The modeling engine can, in some implementations, be configured to aggregate numerous predictive models attributed many people into an aggregate model for predicting affinities for attributes of the decision objects for a general population. The modeling engine can also perform the functions described above in parallel for numerous models and/or people.

In another aspect, the invention provides a technique to determine optimal weightings when combining (and in some cases excluding) individual level models, for example through historical data or through use of partial data models that reserve part of the data for comparison of model accuracy (such as through out-of-sample hit rates).

In another aspect, the invention employs the methods described above to predict affinities for attribute(s) of objects (and even adapt these predictions for other purposes, such as predictive preference share for objects in a competitive or non-competitive environment, sales of objects, profits related to sales of objects, selection of programs, optimal configurations of sets of objects, overall satisfaction with objects or sets of objects, and similar applications), apply a weighting system to the multiple predicted affinities for each individual, and then combine these individual predicted affinities across members of a more general population.

In another aspect, the invention provides software in computer-readable form for performing the methods described herein.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, the emphasis instead is placed on conveying the concepts of the invention.

DETAILED DESCRIPTION

Several methods and techniques claim to estimate an individual's preferences for products or services, and in some cases the methods have been combined with conjoint analysis to generate hierarchical conjoint models for various research applications. In practice, these multi-level models "borrow" information from higher-level parameters that, for example, apply to a group of individuals based on some characteristic common to members of the group in order to estimate lower-level (i.e., individual-specific) parameters. As a result, the final estimates for an individual's affinity for an object reflect a balance of both group and individual level information. The exact balance and the precise information that gets borrowed from the group parameters to estimate the individual parameters depends on which individuals are included in the model and on the assumptions about the distribution of parameters across and within individuals. Often, strict hierarchical models tend to force individual level parameters to fit within a certain pattern of group behavior and may ignore important characteristics of individuals that are not relevant to the group. Although such an approach facilitates estimation of numerous parameters using reduced data and shrinks individual parameter estimates toward the aggregate parameter estimates in order to reduce the prominence of outliers, it misses important groups of individuals that, although smaller in number, represent significant marketing opportunities. Further, this technique fails to account for individuals that generally act in a manner consistent with the group behaviors, but sometimes deviate in important ways.

As one example, hierarchical Bayesian conjoint models typically assume a multivariate normal distribution of preference parameters across individuals. Such an assumption can constrain individual level parameter estimates quite strongly, and these constraints are often not appropriate. Researchers have experimented with methods to allow for some additional flexibility, notably techniques to allow for individuals to be assigned to a preference-based group within which the distribution of preference parameters is multivariate normal (normal mixture models and hierarchical Bayes by latent class being two such examples). This has resulted in significant improvement in model accuracy. However, all of these methods rely only on choice or preference data, and do not incorporate information about group membership that can be found from sources outside of the model data—for instance demographic, attitudinal or behavioral characteristics of individuals—except by modeling these outside factors using direct covariates. Nor do these methods consider individual level predictive parameters from multiple modeling sources and combine them in a manner that reflects each model's ability to accurately predict an specific individual's preferences.

Figure 1:
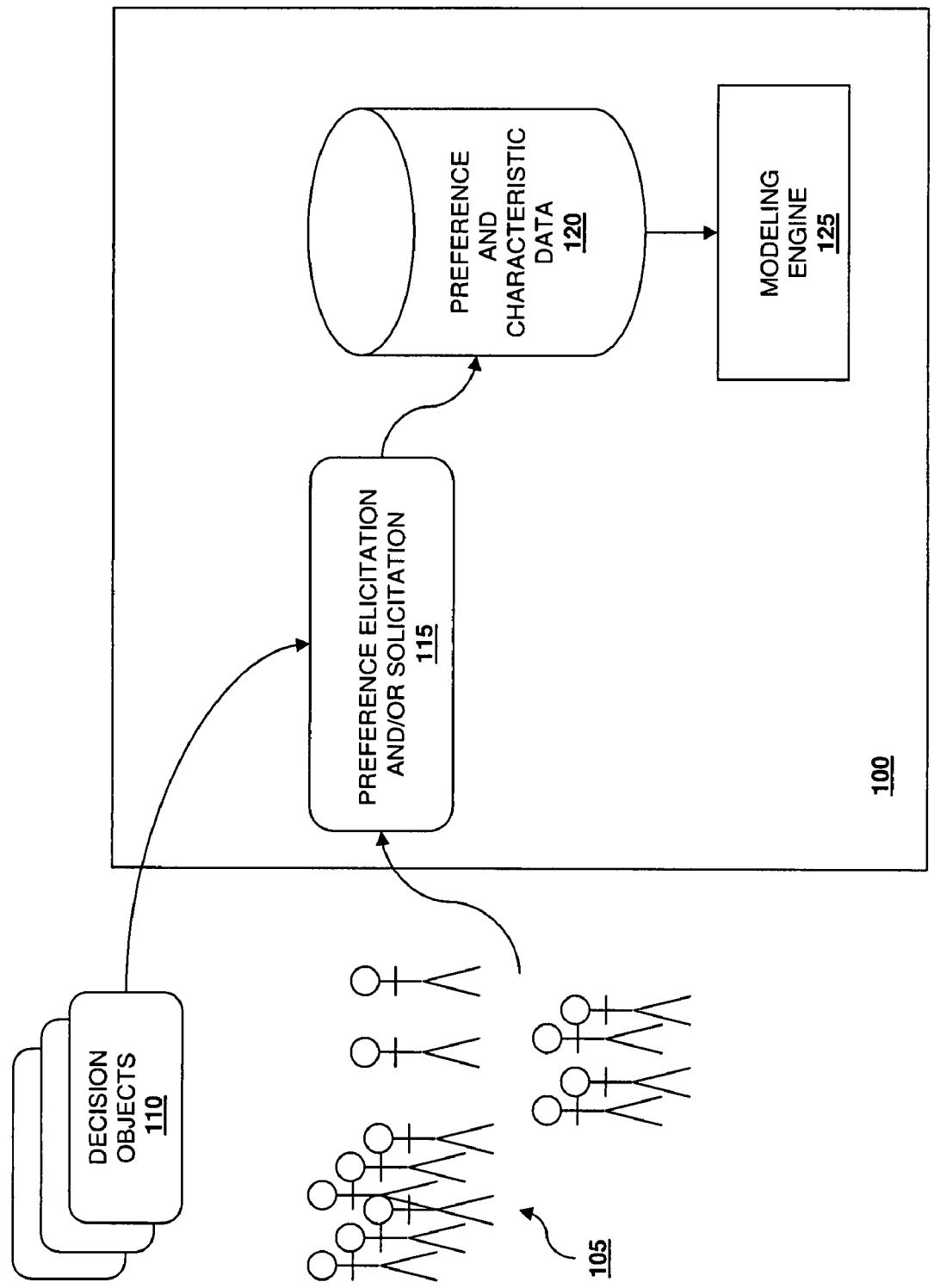
FIG. 1 is a block diagram illustrating one embodiment of the system for performing the invention.

FIG. 1 illustrates, in summary, a technique and associated system 100 for combining individual level preference estimates (referred to herein as affinities) for a single individual from multiple predictive models. The models may be differentiated using arbitrary and/or non-arbitrary grouping variables for the individuals. The system may be used to predict affinities of individuals within any population 105 for decision objects 110. The population 105 may be made up of any number of people having various attitudinal, behavioral and/or demographic characteristics. In some embodiments, the population 105 may be a targeted population (e.g., males between the age of 18 and 25 having recently purchased an automobile over $25,000) such that the characteristics of the population 105 are more similar, whereas in other instances the selection of individuals that make up the population 105 is completely random. In certain implementations, the population 105 may be comprised (either exclusively or in part) of "virtual" people that represent an amalgam of characteristics.

Demographic characteristics such as age, geography, household income, education level, profession, sex, and/or marital status may all be considered when implementing the techniques described herein. In embodiments in which attitudinal characteristics are used, a person's political and/or religious beliefs may be captured, as well as reactions and attitudes toward current events such as wars, crime, popular culture, sports, movies, brands, companies, types of consumer goods and activities, etc. In addition, behavioral characteristics such as shopping habits (e.g., frequency of on-line purchases, preferences for particular stores or products), exercise routines, vacations, medical habits, alcohol, tobacco and/or drug use, use of the Internet, and others may be used to further enhance the accuracy of the predictive model(s) described below.

The decision objects 110 can be any product, service or combination of product or service. For example, decision objects 110 may include consumer goods and/or entertainment media. The decision objects 105 can be any product, service or combination of the two. Decision objects 105 can be investment products, credit cards or financial packages of any sort, telecommunication services or service bundles, automobiles and subparts thereof, apparel, ensembles of clothing, shoes, watches, jewelry, toys, consumer electronics, recipes, foods, beverages, drugs, pharmaceutical or nutraceutical products, book or magazine covers, newspaper layouts, packaging, perfumes, scents, color palettes, fabrics, furnishings and interior designs, wallpaper, chairs, tables, lamps, couches, bed spreads, quilts, carpets, decorative objects, utilitarian objects, or parts thereof, silverware, flatware, crystal ware, fixtures, architecture, web sites and web pages, software, graphical user interfaces, software features, cable TV packages, vacation packages, transportation schedules, travel programs, discount programs, academic programs or curricula; advertising materials such as printed advertisements, billboard messages, logos, messaging platforms, positioning platforms, branding strategies, diet plans, exercise plans, restaurant menus, store layouts, office layouts, direct marketing campaigns (fliers and inserts), e-marketing campaigns, business strategies, speech outlines, sales presentations, election campaigns, story lines, business plans, songs, jingles, business services and personal services.

Decision objects 110 typically can be described as a collection of attributes that make up the decision object. It is often these attributes, their presence, their absence, or a particular combination of attributes that affects an individual's affinity for the decision object or signals that the individual's affinity may deviate from the group norm in some meaningful manner. A given decision object has a series of possible attributes that, when combined, create a complete design or offering. Attributes of a decision object, as used herein, are intended to refer to the structural, functional, aesthetic stylistic, or economic features of the decision object, service or plan and include things such as cost, color or color combination, size, strength, shape, style, pattern, length, weight, content feature, theme, option, choice of material, softness, benefits, brand, etc. Different types of objects may have different groups of possible attributes. Thus, for example, designs for an aesthetically pleasing exterior appearance of a hands-free telephone may have attributes such as material (e.g., plastic or metal), distribution of materials (e.g., plastic sides with metal top), texture, color, color combination, length, width, thickness, size of controls, shape of control, color of controls, position of controls, position of status lights, speaker grill pattern, etc. Designs for a billboard may include attributes such as dimension, aspect ratio, dominant color, background color, color scheme, size of print, presence or absence of pictorial material, various types of content for pictorial material, number of people in a scene, site of the scene (big city, pastoral setting, domestic setting, dance hall), etc.

In the discussion below, the invention is used to predict individual's preferences and affinities for features and options available in the automobile domain. The systems and techniques described herein are, however, applicable to virtually any type of product, service or combination thereof and therefore may be used to predict an individual's affinity within various domains. The approach also applies, for example, to movies, music albums/CDs, games (including online and video games), books, news, apparel, travel, food products, consumer goods, personal services, furniture, sporting goods and restaurants.

The system 100 captures (or is otherwise provided with) explicit and implicit (latent) attributes of the decision objects 110. For example, in the context of automobiles, such explicit information may include the make and model of the automobile, color, price (e.g., MSRP and actual purchase price), the trim level (e.g., sport, luxury, economy), engine size and/or type (e.g., traditional versus hybrid), fuel economy, and/or style (coupe, SUV, truck, sedan, etc.). Other possible features and services that may be offered as standard or optional items on an automobile such as interior trim (leather, cloth), sound/video entertainment system, airbags, heated seats, satellite radio, GPS-based navigation system, roadside assistance, extended warranties, and/or equipment racks may also be captured and stored in the system 100.

A preference and characteristic elicitation process 115 may be used to capture some or all of the information described above. In certain implementations, affinity information may be elicited from people by presenting a short list of decision objects having varied attributes and asking the participants to rate the objects and/or attributes with which she is familiar, allowing her to identify favorites and/or rank the objects from least favorite to most favorite. The elicitation process 115 may, in some instances, be achieved, in whole or in part, by surveying members of the population 105. Survey techniques such as telephone surveys, online polls, email questionnaires, random and/or targeted mailings, hardcopy product inserts, as well as in-person interviews may be used. Previous interactions with retailers (both online and brick-and-mortar) such as historical purchasing behavior, click-stream activity and in-store activities such as viewing particular items, non-purchases, and traffic patterns may also be captured using conventional point-of-sale, video surveillance, database marketing, and on-line monitoring methods. More formal focus group techniques may also be used, including techniques described in U.S. Pat. No. 7,177,851, entitled "Method and Apparatus for Dynamic, Real-time Market Segmentation," the entire disclosure of which is included herein by reference.

In some instances, some or all of the demographic, attitudinal, behavioral and/or affinity data described above may be collected by a entity (or entities) separate from the entity providing the modeling and predictive services of the invention. For example, in the automobile context, auto manufacturers may provide certain data (e.g., sales statistics for various models segmented by geography) and may contract with external market research firms to collect follow-on data from recent purchasers (or non-purchasers) to collect demographic information. Such data may then be combined into a common database that provides the raw data for the methods described herein. In certain cases, the data may be preprocessed to eliminate incomplete records or to accommodate for other errors introduced during the data collection process. Other sources of data such as government and municipal entities may also be used as sources of general demographic and/or economic data.

The system maintains a data store 120 that contains the results of the elicitation process 115 and/or consolidates data purchased, licensed or otherwise received from third-party data providers. The data store 120 provides the data to a modeling engine 125 that executes the main programming instructions directed to the techniques and methods described below.

In some embodiments, the data store 120 and modeling engine 125 are implemented on one or more computers. For example, the modeling engine 125 may be implemented on one or more server class computers that have sufficient memory, data storage, and processing power and that run a server class operating system (e.g. SUN Solaris, GNU/Linux, MICROSOFT WINDOWS NT). Other types of system hardware and software than that described here could also be used, depending on the amount of data being processed and the processing power needed to build and process the predictive models. For example, the server may be part of a server farm or server network, which is a logical group of one or more servers. As another example, there may be multiple servers that may be associated or connected with each other, or multiple servers could operate independently, all using data stored in a common data store 120. As is typical in large-scale systems, application software directed to implementing the functions of the modeling engine can be implemented using multiple components, with different components running on different server computers, on the same server, or some combination.

In some versions, portions of the system may be implemented as client-based functions operating remotely and as part of a network of computers that allocate processing responsibilities among the clients and/or server as necessary. For example, a client computer may be a implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others).

The data store 120 may be implemented using any one (or combination of) commercially available database management systems used to store data related to the population 105, decision objects 110, attributes of the decision objects, and results of the preference elicitation process 115. For instance, the data store 120 may store information relating to the various types of automobiles offered by a particular manufacturer, automobiles on the market in general, recent purchase histories, demographic information of recent purchasers, and results of one or more surveys aimed at eliciting individual characteristics of members of the population 105 such as those described above. The data store may also contain separate databases for each type of data, especially in instances in which the data is received from different entities. Examples of database systems that may be used to implement the data store include the MySQL Database Server by MySQL AB of Uppsala, Sweden, the PostgreSQL Database Server by the PostgreSQL Global Development Group of Berkeley, Calif., and the ORACLE Database Server offered by ORACLE Corp. of Redwood Shores, Calif.

Figure 2:
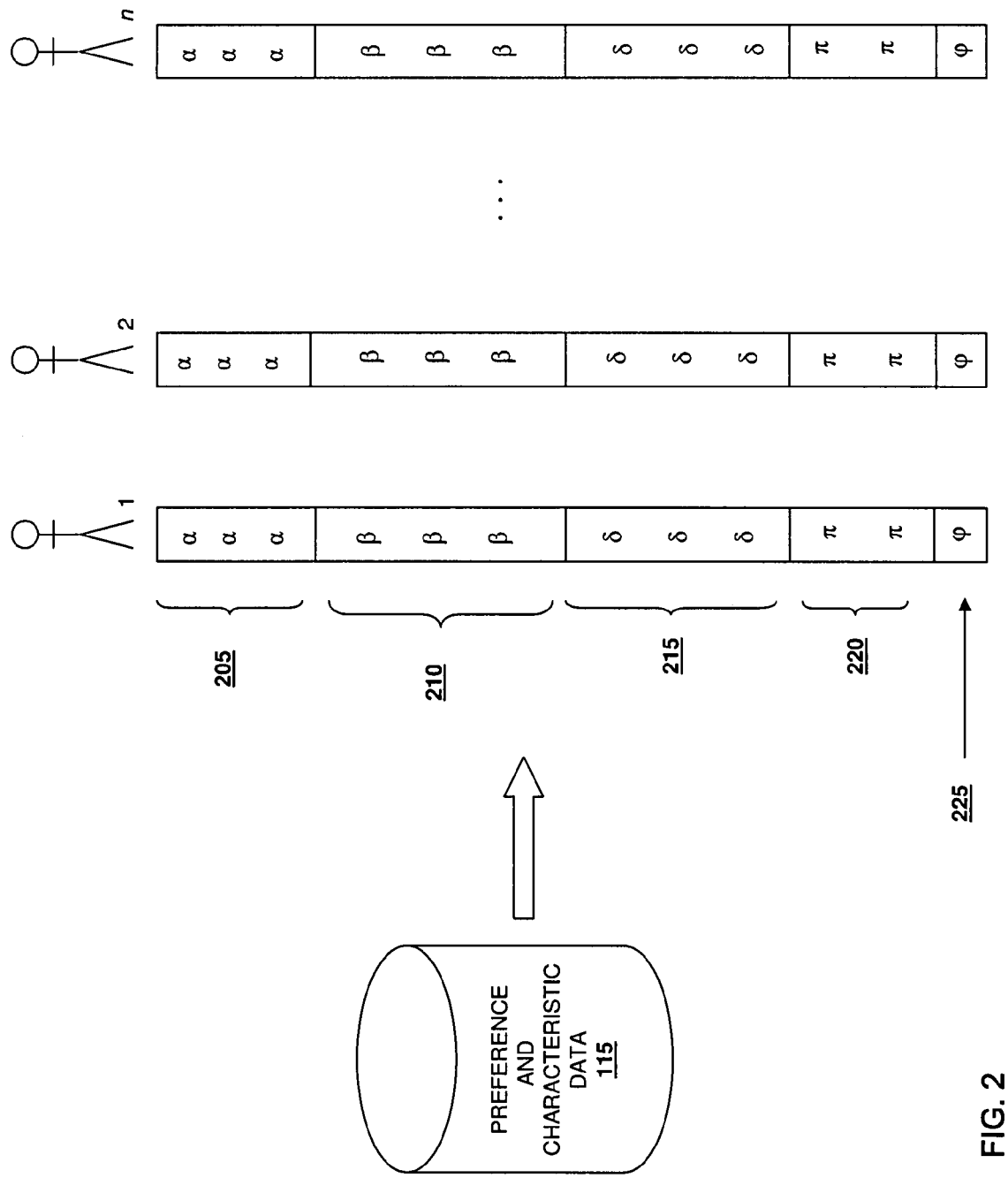
FIG. 2 is a more detailed diagram illustrating one embodiment of the system for performing the invention.

Referring now to FIG. 2, individuals within a population of N people are indexed from 1 to N, and generally referred to as $i_n$. For each individual $i_n$, a data vector may be defined that contains that individual's data as stored in the data store 115. For example, the data vector may be comprised of some combination of attitudinal, behavioral, demographic and/or preference data for the individual with respect to one or more decision objects and attributes thereof. For reference, attitudinal characteristics 205 for individual $i_n$ may be referred to as $\alpha_{jn}$ where j represents the number of attitudinal characteristics $\alpha$ for individual $i_n$. Likewise, behavioral characteristics 210 for individual $i_n$ may be referred to as $\beta_{kn}$ where k represents the number of behavioral characteristics $\beta$ for individual $i_n$. Demographic characteristics 215 for individual $i_n$ may be referred to as $\delta_{ln}$ where l represents the number of demographic characteristics $\delta$ for individual $i_n$. In addition to characteristics inherent to the individual, preference data may also be included in the data vector. Such preference data 220 for individual $i_n$ may be referred to as $\pi_{mn}$ where m represents the number of demographic characteristics $\pi$ for individual $i_n$.

The techniques and system described herein use the data described above to predict an individual's affinity for a particular attribute or combination of attributes using numerous models. More specifically, the technique involves using separate multi-level (i.e., hierarchical) models for subgroups of individuals to estimate affinity parameters for an individual (based, for example, on the characteristics of the individuals) and combining each of the individual level parameter estimates for each person to obtain a more accurate parameter estimate for predicting a particular person's affinity for a decision object. The estimates can be weighted in proportion to each models ability to accurately predict or explain previously expressed preferences of the respective person. In some implementations, the technique also allows for aggregate level parameter estimates from different models to be combined with individual level parameter estimates using weighting techniques as described above.

For example, in the automobile context, various attitudinal, behavioral and demographic characteristics for person $i_n$, may indicate that the user is a male, over 50 years old, having a household income over $100,000, that typically votes Republican, vacations in Florida twice a year, plays golf on a regular basis, and indicated an affinity for black sedans having heated leather seats, a high-end sound system, and a DVD navigation system. In such a case, an automobile manufacturer may want to predict such an individual's affinity for a previously untested attribute or combination of attributes $\phi_n$ 225 such as satellite radio or a sports package that includes a combination of optional equipment such as a roof rack and trailer hitch. The attribute may also include pricing parameters such that $\phi_n$ represents the optional equipment at a particular price point, e.g., satellite radio offered for free for one year versus the same option offered at a reduced annual price.

Figure 3:
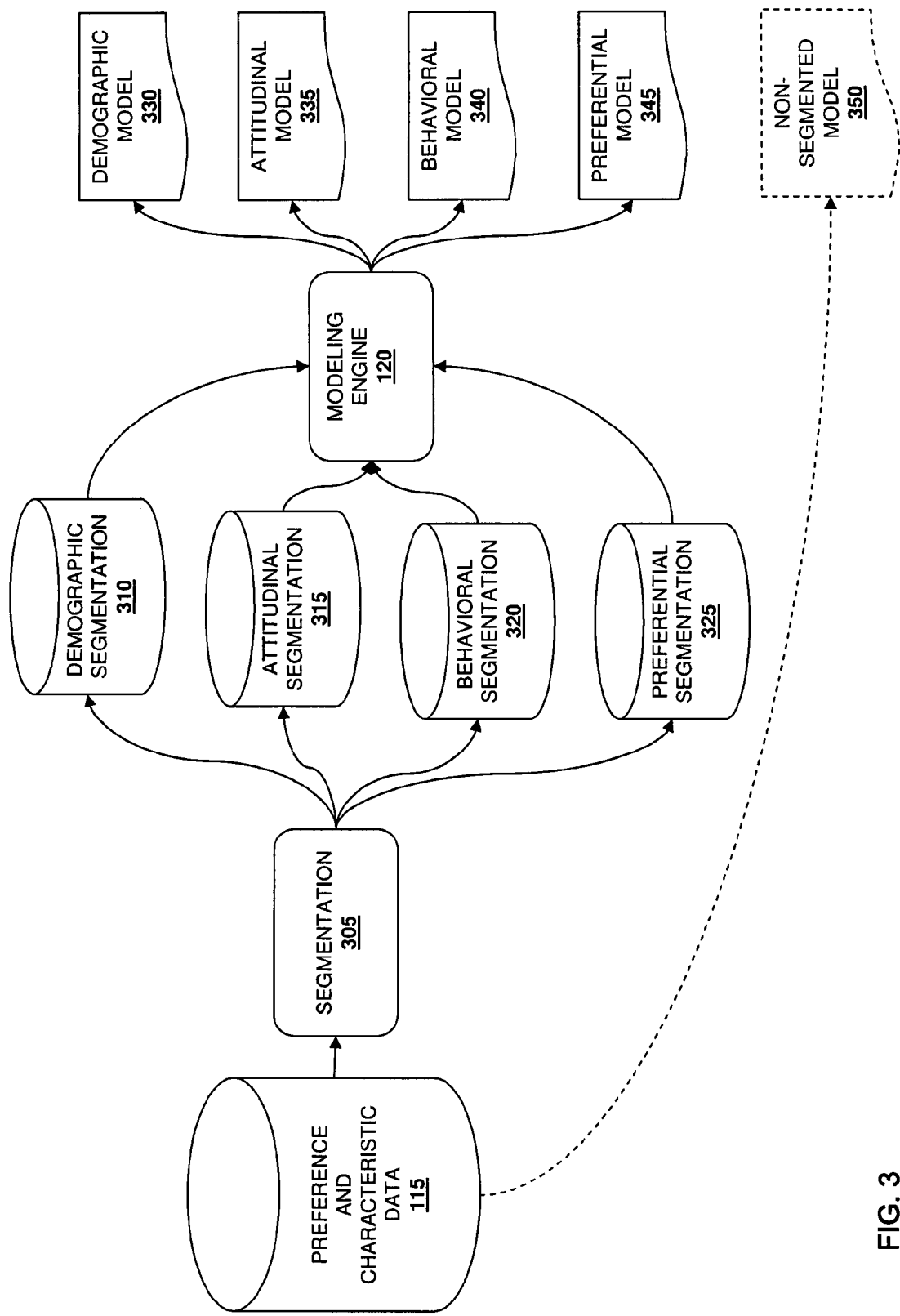
FIG. 3 is a flowchart showing one embodiment of the process steps for building a model predicting an individual's utilities for attributes of decision objects in accordance with the invention.

Referring to FIG. 3, the preference and characteristic data 115 is segmented according to one or more of the characteristics. More specifically, segmentation 305 includes selecting data vectors attributed to individuals for whom the data meets one or more segmentation parameters. For example, demographic segmentation 310 may include selecting data vectors for individuals that are male, over 50 years old, and earn over $100,000 per year. Attitudinal segmentation 315 may include selecting data vectors for individuals that have indicated they are concerned about global warming, believe that universal healthcare is a good idea, and tend to support Democratic political candidates. Behavioral segmentation 320 may include selecting data vectors for individuals that play golf on a regular basis, own more than two cars, take annual ski vacations and make significant purchases online. Preferential segmentation 325 may include selecting data vectors for individuals that have indicated preferences for certain products or attributes of products, such as indicating they prefer blue cars, leather seats, and four-door sedans. In some implementations, data vectors may be selected at random (or used in their entirety), effectively skipping the segmentation process 305.

Each set of segmented data vectors may then be used as input for the modeling engine 120 which derives predictive models from the segmented data. For example, a demographic model 330 such as a hierarchical Bayes model may be derived using the segmented demographic data, the purpose of the model 330 being to attempt to predict an individual's affinity for a new or changed decision object based on their membership in a particular demographic group. Similarly, an attitudinal model 335 such as a hierarchical Bayes model based on, for example, political party affiliation may be derived from data segmented according to such affiliations and used to predict an individual's affinity for the same new or changed decision object. Other models may also be derived, including, for example, a hierarchical Bayes model 340 based on behavior that uses data segmented based on behaviors such as recent vacations, frequency of attending the theater, etc. As a result, multiple predictive models can be built to estimate the affinity that any member (not necessarily a specific member) of each group will have for one or more decision objects or attributes thereof.

As depicted, each person belongs to one of each type of group. However, such a depiction is for illustrative purposes only, as an individual may belong to more than one demographic segment, more than one behavioral segment and/or more than one attitudinal segment. Moreover, the models may be developed independently for each segment (whether they be demographic, behavioral or attitudinal) and then combined using a weighting mechanism. For example, an individual may belong to a demographic segment identified as "annual income over $100,000 and over 50 years old" and a member of another demographic segment identified as "unmarried female." Separate models can be developed for the individual using the two different segments, which may then be combined (along with other models derived using other groups to which she belongs), resulting in an improved individual-specific model.

Figure 4:
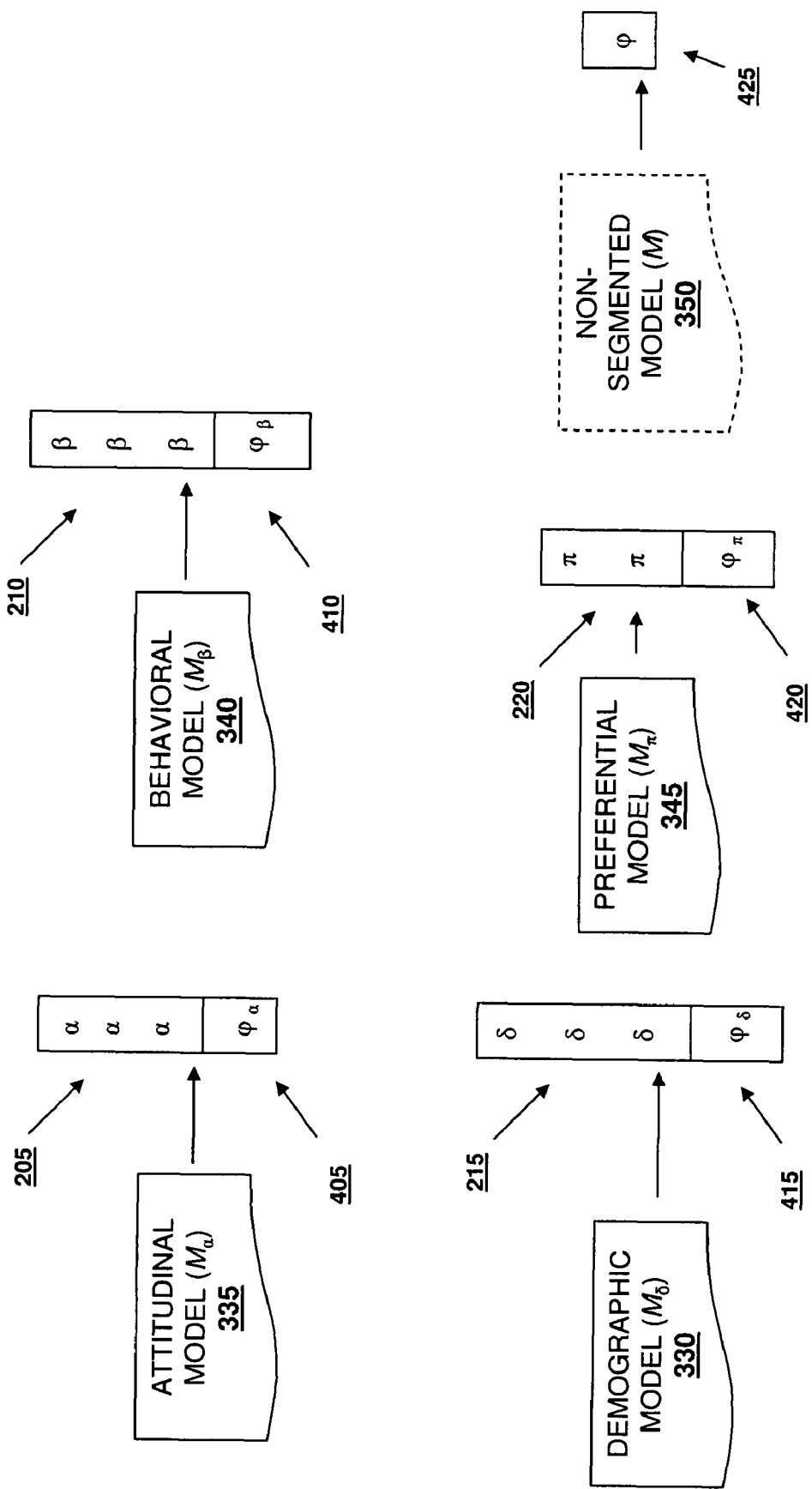
FIG. 4 is a diagram illustrating the application of various predictive models to determine individual predicted affinities for attributes of decision objects in accordance with various embodiments of the invention.

Referring to FIG. 4 the derived models may then be used to predict a particular person's affinity for a particular decision object or attribute. For example, the demographic model $M_\delta$ 330 may be applied to data vector 215 that represents attitudinal preferences of a particular person i who meets the specific demographic parameters used to build the model 330 to estimate that person's predicted affinity $\phi_{\delta i}$ 415 for an attribute based their membership in that demographic group. In the context of automobile sales, the demographic model $M_\delta$ 330 may be developed based on a pool of individuals that are between the ages of 30 and 40, have a household income over $75,000 and are college educated. The demographic model $M_\delta$ 330 may then be used to predict a particular individual's affinity for purchasing a hybrid, given that they are a member of that grouping. Similarly, the attitudinal model $M_\alpha$ 335, behavioral model $M_\beta$ 340 and preferential model $M_\pi$ 345 may be applied to the respective data vectors 205, 210, and 220 to predict a particular individual's affinity $\phi_{\alpha i}$ 405, $\phi_{\beta i}$ 410 and $\phi_{\pi i}$ 420 for purchasing a hybrid automobile based on their membership in each of the respective groups. In general, the degree to which these predictions accurately reflect a particular person's true preferences for (or against) a particular decision object or attribute depends on the correlation between the characteristics used to build the model and the decision object being tested. In effect, the technique groups individuals into collections based on like characteristics, builds a model for each grouping that estimates the affinity that each member of the group will have for a product, and applies the model to a particular person to assess its applicability to that person. In some embodiments, a non-segmented model M 350 may be derived based on the entire group (or some random sample) and used to predict a person's affinity $\phi'$ 425 based solely on the entire population's data.

Figure 5:
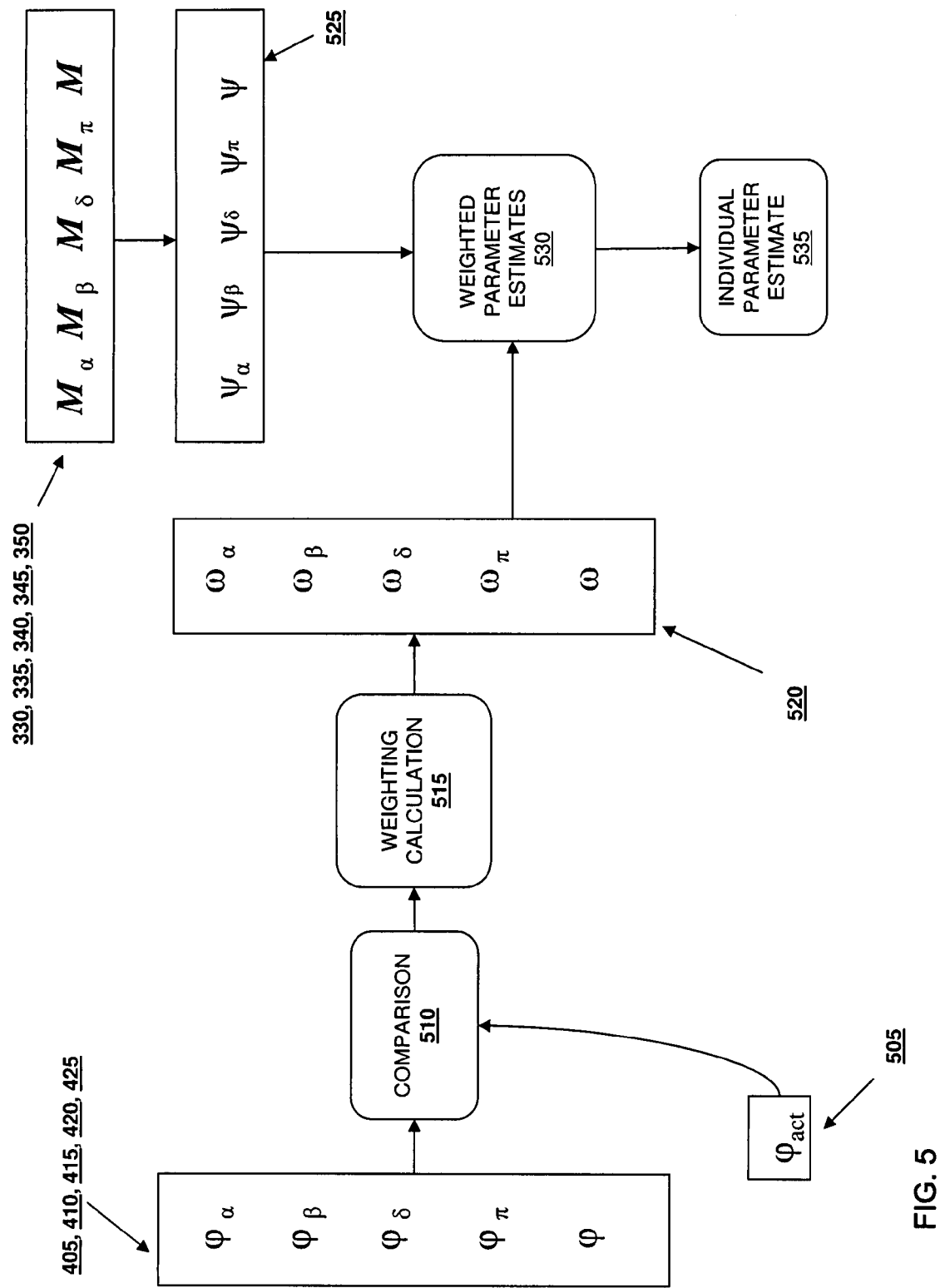
FIG. 5 is a flowchart illustrating the determination and application of weighting parameters for combining the models of FIG. 3 into a predictive model for an individual in accordance with various embodiments of the invention.

Referring now to FIG. 5, each of the predicted affinities $\phi_{\alpha i}$ 405, $\phi_{\beta i}$, 410 $\phi_{\delta i}$, 415, $\phi_{\pi i}$ 420 and $\phi'_i$ 425 for individual i are then compared (STEP 510) to that individual's actual, known affinity $\phi_{act}$ 505 for the decision object or attribute, essentially determining how accurately the derived models were able to predict that person's affinity based on a group-level hierarchical predictive model. In one example, the comparison utilizes a likelihood estimation method to measure the accuracy of the parameter estimates with respect to the observed values. For subsequent applications of the models 330, 335, 340, 345 and 350 (e.g., for using the models to predict an individual's affinity for a new feature, for example) the parameter estimates $\psi_\alpha$, $\psi_\beta$, $\psi_\delta$, $\psi_{\pi\alpha}$, and $\psi$ (collectively 525) resulting from each model may then be weighted (STEP 515) based on the results of the prior comparison, such that those models that accurately predicted a person's affinity for an object receive higher weightings than those that do not. The weightings ($\omega_\alpha$, $\omega_\beta$, $\omega_\delta$, $\omega_\pi$ and $\omega$) 520 are essentially used (STEP 525) to compensate for each model's ability to explain an individual's observed behavior, thus creating an individual parameter estimate 530 that more accurately predicts a particular person's affinity for the new, changed or combination of decision objects.

In one example, the parameter estimates resulting from the use of each model can be combined according to the weights by taking a weighted average. In such case, the parameter estimate for an individual i would be:

$$E_i = \frac{\omega_n \psi_n}{\sum_n \omega_n}$$

Using the automobile example above, each model may provide a different degree of insight into whether a particular individual is likely to spend and additional $4,000 on a hybrid automobile. The demographic model $M_\delta$ 330 may, for example, provide a only a slightly accurate prediction based on a person's age and gender as compared to the attitudinal model $M_\alpha$ 335 based, for example, on a person's expressed concern for the environment and slightly liberal political views. In such a case, the weighting $\omega_\alpha$ attributed to the attitudinal model $M_\alpha$ 335 will be greater than the weighting $\omega_\delta$ applied to the demographic model $M_\delta$ 330. Subsequently, when the automaker introduces a new feature that has similar attributes to a hybrid (e.g., air filters, or a high percentage of parts made from recycled products), the composite parameter estimate 530 will consider the degree to which each underlying model was able to predict her affinity for other features of the automobile.

In some embodiments, the individual parameter estimates for each person may be combined to create a composite parameter estimate for the group. Because the underlying parameter estimates for each person in the group more accurately reflect their affinity for an object or attribute, combining the parameter estimates creates a very accurate model for the group as a whole. Essentially, pockets of people within the overall population whose tendencies would have otherwise been overlooked or "smoothed" to conform with the more general population remain relevant because their personal parameter estimates attribute greater weight to those models that more accurately predict their individual likes and dislikes.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A computer-implemented method of developing a model predictive of preferences of people among decision objects having one or more attributes, the method comprising the steps of:
   a. obtaining, at a computer, a data set indicative of characteristics and expressed affinity for attributes of the decision objects pertaining to a plurality of people;
   b. obtaining, at the computer, sets of predictive models based at least in part on the data set, wherein a first set comprises predictive models based on segmenting the data set by said demographic characteristics, a second set comprises predictive models based on segmenting the data set by said affinity for the attributes, and a third set comprises a non-segmented predictive model based on the data set;
   c. selecting a predictive model from each of the first and second sets for a person based on the person's characteristics and the person's expressed affinity for the attributes of the decision objects;
   d. calculating, by a computer processor, the person's predicted affinity for the attributes of the decision objects using each of the three selected models;
   e. calculating, by a computer processor, a weighting factor for each of the three selected models; and
   f. combining, by a computer processor, the calculated predicted affinities for the attributes of the decision objects based on the weighting factors to produce a predictive model for the person's affinity for the attributes of the decision objects.

2. The computer-implemented method of claim 1 wherein the decision object is selected from the group comprising investment products, automobiles and subparts thereof, apparel, ensembles of clothing, shoes, watches, jewelry, toys, consumer electronics, recipes, foods, book or magazine covers, newspaper layouts, packaging, perfumes, scents, color palettes, fabrics, furnishings and interior designs, wallpaper, chairs, tables, lamps, couches, bed spreads, quilts, carpets, decorative objects, utilitarian objects, or parts thereof, silverware, flatware, crystal ware, fixtures, architecture, web sites and web pages, software, graphical user interfaces, software features, cable TV packages, vacation packages, transportation schedules, academic programs or curricula; advertising materials such as printed advertisements, billboard messages, logos, diet plans, exercise plans, restaurant menus, store layouts, office layouts, direct marketing campaigns (fliers and inserts), e-marketing campaigns, business strategies, speech outlines, sales presentations, election campaigns, story lines, business plans, songs, jingles, business services and personal services.

3. The computer-implemented method of claim 1 wherein the attributes of the decision objects comprise one or more of product SKU, benefits, positioning statements, ingredients, efficacy, side effects, dosage, delivery, material components, size, color, shape, price, material, design, shape, contents, packaging, theme, dimension, aspect ratio, dominant color, background color, color scheme, size of print, presence or absence of pictorial materials, manner of presentation, varying types of content for pictorial materials, and text content.

4. The computer-implemented method of claim 1 wherein the characteristics comprise one or more of demographic characteristics, behavioral characteristics and attitudinal characteristics.

5. The computer-implemented method of claim 4 wherein the characteristics comprise demographic characteristics, and the demographic characteristics comprise one or more of age, sex, nationality, political affiliation, income level, geographic affiliation, religion, race, education, profession, height, physical condition, health condition and weight.

6. The computer-implemented method of claim 4 wherein the characteristics comprise behavioral characteristics, and the behavioral characteristics comprise one or more of product/food/service usage, product/food/service consumption behavior, product ownership, daily activities, non-daily activities, personal habits, social habits or activities, transportation behavior, entertainment consumption behavior.

7. The computer-implemented method of claim 4 wherein the characteristics comprise attitudinal characteristics, and the attitudinal characteristics comprise one or more of beliefs, thought patterns, thought habits, opinions, likes and dislikes, and any combination thereof.

8. The computer-implemented method of claim 4 wherein the one or more of the demographic characteristics, behavioral characteristics and attitudinal characteristics are self-reported.

9. The computer-implemented method of claim 4 wherein the one or more of the demographic characteristics, behavioral characteristics and attitudinal characteristics are derived.

10. The computer-implemented method of claim 1 wherein the weighting factors are based on relationships between the person's predicted affinity for the attributes of the decision objects calculated using the respective model and the person's expressed affinity for such attributes.

11. The computer-implemented method of claim 10 wherein the relationship between the person's predicted affinity for the attributes of the decision objects and the person's expressed affinity for such attributes comprises a score reflecting the accuracy of the predicted affinity for the attributes of the decision objects to the person's expressed affinity for such attributes.

12. The computer-implemented method of claim 11 wherein the weighting factor attributed to each model is proportional to the score for the respective model divided by the combined scores for all of the selected models.

13. The computer-implemented method of claim 1 wherein the first set of predictive models comprises a hierarchical Bayesian model.

14. The computer-implemented method of claim 1 wherein the second set of predictive models comprises a hierarchical Bayesian model.

15. The computer-implemented method of claim 1 further comprising calculating, by the processor, a subset weighting factor for subsets of the attributes using each of the selected models and combining the calculated predicted affinities for each attribute of the decision objects based on the subset weighting factors.

16. The computer-implemented method of claim 1 wherein the first and second predictive models further comprise aggregated, non-hierarchical, group-specific predictive models.

17. The computer-implemented method of claim 1 further comprising recommending a decision object to the person based at least in part on the predictive model for the person's affinity for the attributes of the decision objects.

18. An article of manufacture having computer-readable program portions embodied thereon for developing a model predictive of preferences of people among decision objects having a plurality of attributes, the article comprising computer-readable instructions for:

a. obtaining a data set indicative of characteristics and expressed affinity for attributes of the decision objects pertaining to a plurality of people;
b. obtaining sets of predictive models based at least in part on the data set, wherein a first set comprises predictive models based on segmenting the data set by said demographic characteristics, a second set comprises predictive models based on segmenting the data set by said affinity for the attributes, and a third non-segmented predictive model based on the data set;
c. selecting a predictive model from each of the first and second sets for a person based on the person's demographic characteristics and the person's expressed affinity for the attributes of the decision objects;
d. calculating the person's predicted affinity for the attributes of the decision objects using each of the three selected models;
e. calculating a weighting factor for each of the three selected models; and
f. combining the calculated predicted affinities for the attributes of the decision objects based on the weighting factors to produce a predictive model for the person's affinity for the attributes of the decision objects.

19. The article of manufacture of claim 18 wherein the characteristics comprise one or more of demographic characteristics, behavioral characteristics and attitudinal characteristics.

20. The article of manufacture of claim 18 further comprising computer-readable instructions for repeating steps c) through f) for a plurality of people to obtain a plurality of predictive models and aggregating the predictive models into an aggregate model for predicting affinities for attributes of the decision objects among a general population.

21. The article of manufacture of claim 18 further comprising computer-readable instructions for calculating a subset weighting factor for subsets of the attributes of the decision objects using each of the models attributed to the person, and combining the calculated predicted affinities for each attribute of the decision objects based on the subset weighting factors.

22. A system for developing a model predictive of preferences of people among decision objects having a plurality of attributes, the system comprising
a modeling engine configured to:
  i) apply sets of predictive models to a data set indicative of characteristics and expressed affinity for attributes of a plurality of decision objects pertaining to a plurality of people, wherein a first set of predictive models comprises predictive models segmented by the characteristics, a second set of predictive models comprises predictive models segmented by the affinity for the attributes of the decision objects and a third non-segmented predictive model based on the data set;
  ii) select a predictive model from each of the first and second sets for a person based on the person's characteristics and the person's expressed affinity for the attributes of the decision objects;
  iii) calculate the person's predicted affinity for the attributes of the plurality of decision objects using each of the three selected models;
  iv) calculate a weighting factor for each of the three selected models; and
  v) combine the calculated predicted affinities for each attribute of the decision objects based on the weighting factors to produce a predictive model for the individual's affinity for the attributes of the decision objects.

23. The system of claim 22 further comprising a data storage module for storing the data set.

24. The system of claim 22 wherein the characteristics comprise one or more of demographic characteristics, behavioral characteristics and attitudinal characteristics.

25. The system of claim 22 wherein the modeling engine is further configured to aggregate a plurality of the predictive models attributed to the plurality of people into an aggregate model for predicting affinities for attributes of the decision objects among the plurality of individuals.

26. The system of claim 22 wherein the modeling engine comprises a plurality of processing components, each component configured to perform functions i) through iv) for each of the selected models simultaneously.

27. The system of claim 22 wherein the decision object is selected from the group comprising investment products, automobiles and subparts thereof, apparel, ensembles of clothing, shoes, watches, jewelry, toys, consumer electronics, recipes, foods, book or magazine covers, newspaper layouts, packaging, perfumes, scents, color palettes, fabrics, furnishings and interior designs, wallpaper, chairs, tables, lamps, couches, bed spreads, quilts, carpets, decorative objects, utilitarian objects, or parts thereof, silverware, flatware, crystal ware, fixtures, architecture, web sites and web pages, software, graphical user interfaces, software features, cable TV packages, vacation packages, transportation schedules, academic programs or curricula; advertising materials such as printed advertisements, billboard messages, logos, diet plans, exercise plans, restaurant menus, store layouts, office layouts, direct marketing campaigns (fliers and inserts), e-marketing campaigns, business strategies, speech outlines, sales presentations, election campaigns, story lines, business plans, songs, jingles, business services and personal services.

28. The method system of claim 22 wherein the attributes of the decision objects comprise one or more of product SKU, benefits, positioning statements, ingredients, efficacy, side effects, dosage, delivery, material components, size, color, shape, price, material, design, shape, contents, packaging, theme, dimension, aspect ratio, dominant color, background color, color scheme, size of print, presence or absence of pictorial materials, manner of presentation, varying types of content for pictorial materials, and text content.

29. The system of claim 22 wherein the characteristics comprise one or more of demographic characteristics, behavioral characteristics and attitudinal characteristics.

30. The system of claim 29 wherein the characteristics comprise demographic characteristics, and the demographic characteristics comprise one or more of age, sex, nationality, political affiliation, income level, geographic affiliation, religion, race, education, profession, height, physical condition, health condition and weight.

31. The system of claim 29 wherein the characteristics comprise behavioral characteristics, and the behavioral characteristics comprise one or more of product/food/service usage, product/food/service consumption behavior, product ownership, daily activities, non-daily activities, personal habits, social habits or activities, transportation behavior, entertainment consumption behavior.

32. The system of claim 29 wherein the characteristics comprise attitudinal characteristics, and the attitudinal characteristics comprise one or more of beliefs, thought patterns, thought habits, opinions, likes and dislikes, and any combination thereof.

33. The system of claim 29 wherein the one or more of the demographic characteristics, behavioral characteristics and attitudinal characteristics are self-reported.

34. The system of claim 29 wherein the one or more of the demographic characteristics, behavioral characteristics and attitudinal characteristics are derived.

35. The method system of claim 22 wherein the weighting factors are based on relationships between the person's predicted affinity for the attributes of the decision objects calculated using the respective model and the person's expressed affinity for such attributes.

36. The system of claim 35 wherein the relationship between the person's predicted affinity for the attributes of the decision objects and the person's expressed affinity for such attributes comprises a score reflecting the accuracy of the predicted affinity for the attributes of the decision objects to the person's expressed affinity for such attributes.

37. The system of claim 36 wherein the weighting factor attributed to each model is proportional to the score for the respective model divided by the combined scores for all of the selected models.

38. The system of claim 22 wherein the first set of predictive models comprises a hierarchical Bayesian model.

39. The system of claim 22 wherein the second set of predictive models comprises a hierarchical Bayesian model.

40. The system of claim 22 wherein the modeling engine is further configured to calculate a subset weighting factor for subsets of the attributes using each of the selected models and combining the calculated predicted affinities for each attribute of the decision objects based on the subset weighting factors.

41. The system of claim 22 wherein the first and second predictive models further comprise aggregated, non-hierarchical, group-specific predictive models.

42. The system of claim 22 wherein the modeling engine is further configured to recommend a decision object to the person based at least in part on the predictive model for the person's affinity for the attributes of the decision objects.

* * * * *